Oct. 30, 1923.

E. A. KEELER

MEASURING APPARATUS

Filed Oct. 19, 1920

INVENTOR.
Earl A. Keeler
BY Cornelius D. Ehret
his ATTORNEY.

Oct. 30, 1923.
E. A. KEELER
MEASURING APPARATUS
Filed Oct. 19, 1920
2 Sheets-Sheet 2
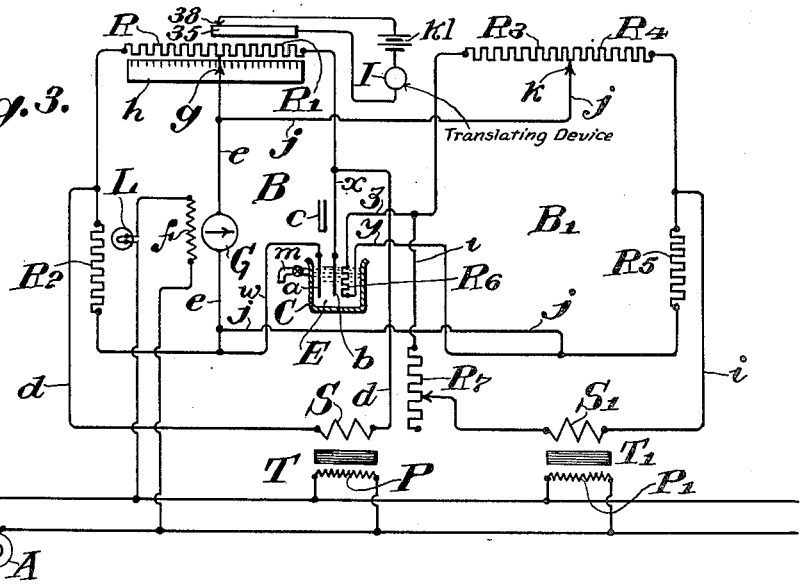
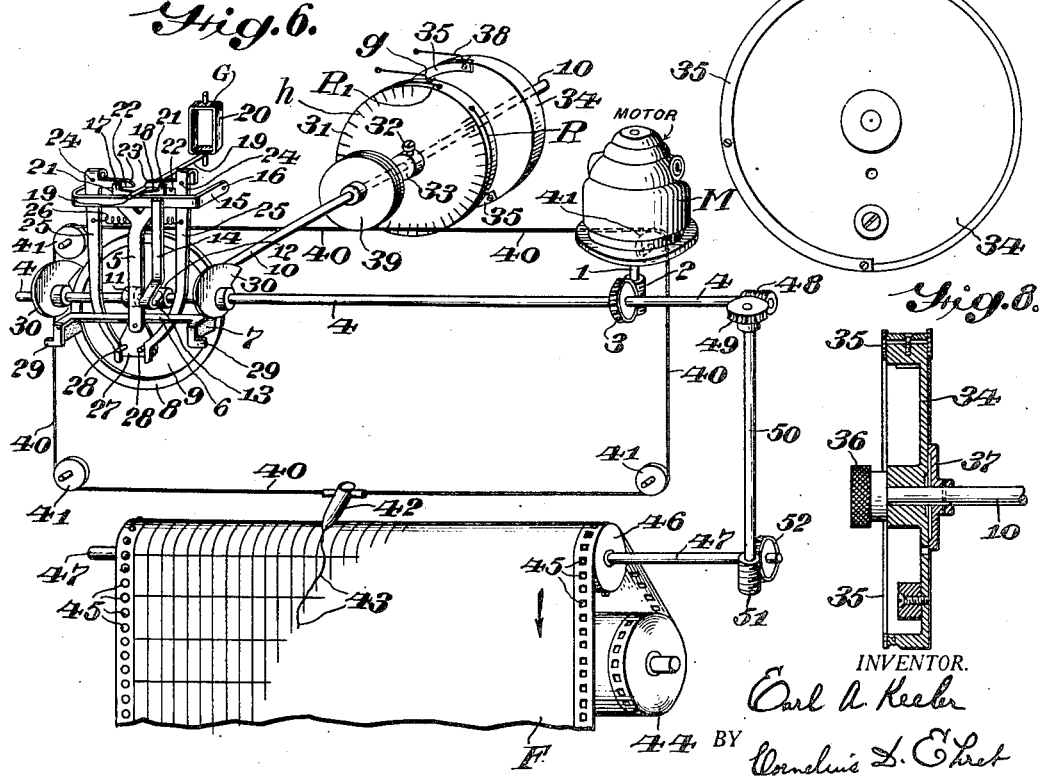
INVENTOR.
Earl A. Keeler
BY Cornelius D. Ehret
his ATTORNEY.

Patented Oct. 30, 1923.

1,472,125

UNITED STATES PATENT OFFICE.

EARL A. KEELER, OF NORRISTOWN, PENNSYLVANIA, ASSIGNOR TO LEEDS & NORTHRUP COMPANY, OF PHILADELPHIA, PENNSYLVANIA, A CORPORATION OF PENNSYLVANIA.

MEASURING APPARATUS.

Application filed October 19, 1920. Serial No. 418,020.

*To all whom it may concern:*

Be it known that I, EARL A. KEELER, a citizen of the United States, residing in Norristown, county of Montgomery, State of Pennsylvania, have invented certain new and useful Improvements in Measuring Apparatus, of which the following is a specification.

My invention relates to apparatus for automatically controlling, in response to variation in conductivity or concentration of a solution, as of one or more electrolytes, any translating device, as an indicator, alarm, motor, recorder, etc.

In accordance with my invention, by means of a Wheatstone bridge, or equivalent, a galvanometer is controlled in response to changes in conductivity of a solution, the galvanometer in turn controlling automatic mechanism for balancing or tending to balance the Wheatstone bridge, or equivalent, such mechanism also controlling the operation of a recorder or marker, or equivalent, and controlling also an alarm, indicator, motor or other translating device, in response to change in conductivity of the solution.

My invention resides in apparatus of the character hereinafter described and claimed.

For an illustration of some of the various forms my invention may take, reference is to be had to the accompanying drawings, in which:

Fig. 3 is a diagrammatic view of modified circuit arrangements which may be employed in accordance with my invention.

Fig. 6 is a perspective view of automatic mechanism responsive to changes in conductivity for controlling a marker or recorder and for effecting any other suitable control, as control or closure of a circuit.

Fig. 7 is an elevational view of one of the disks of Fig. 6.

Fig. 8 is a vertical sectional view of the disks illustrated in Fig. 7.

While my invention relates in general to variations in conductivity of a solution, it will be described more particularly in connection with variation of conductivity of water of or within a steam boiler used for the generation of steam.

In operation of a steam boiler, it is desirable that the concentration of salts in the boiler water should not become excessive, since foaming and incrustation might result. It accordingly becomes necessary during the operation of a boiler to keep the concentration of the dissolved salts below a maximum or predetermined concentration that has been found satisfactory. Reductions of concentration of salts caused by the cumulative effect of continuous evaporization of water may be secured by blowing out a portion of the boiler contents from time to time, the water blown out or withdrawn being replaced by water of lower salt concentration, with the result that the salt concentration within the boiler is reduced.

Figure 1:
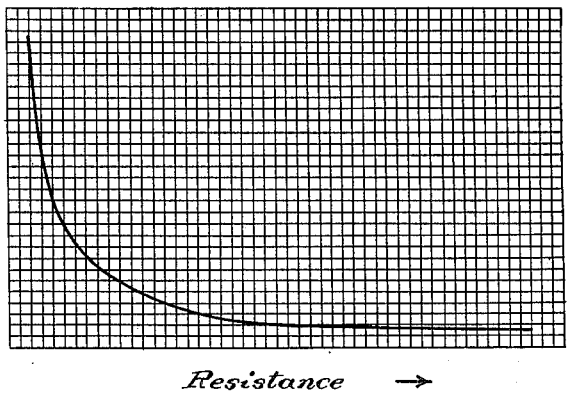
Fig. 1 is a graphic representation of one example of variation of resistance of a solution with variations in concentration thereof, as of boiler water.

As indicated by the curve of Fig. 1, with high salt concentration in the boiler water the electrical resistance is low or the conductivity high, the conductivity diminishing with decrease in concentration of salts, the relation between resistance and concentration being generally, and probably always other than a simple ratio or direct proportion.

In accordance with my invention, the conductivity or resistance of the boiler water, or other solution, is employed to determine or indicate its total dissolved content, as of electrolytes in general, as salts, alkalies or acids.

In connection with boiler operation, for example, the conductivity of the water within the boiler may be measured or determined from time to time and so make it possible to determine suitable or proper time for blowing out boiler water, thus avoiding too frequent "blow-downs" or too great intervals between them.

In accordance with my invention, the conductivity of the solution is measured, preferably continuously, by automatic means, a record of the conductivity being automatically made and the apparatus also automatically effecting any suitable control, as that of an electric circuit of or controlling an indicator, alarm, electric motor, boiler blow-down valve, or any other suitable device.

The solution whose conductivity is measured is correlated with a Wheatstone bridge, or equivalent, whose galvanometer controls automatic mechanism which continuously effects a measurement of the conductivity and in addition produces a record and effects any suitable control.

Since the conductivity of a solution of a given concentration will vary with temperature, suitable means are provided for temperature compensation.

Figure 2:
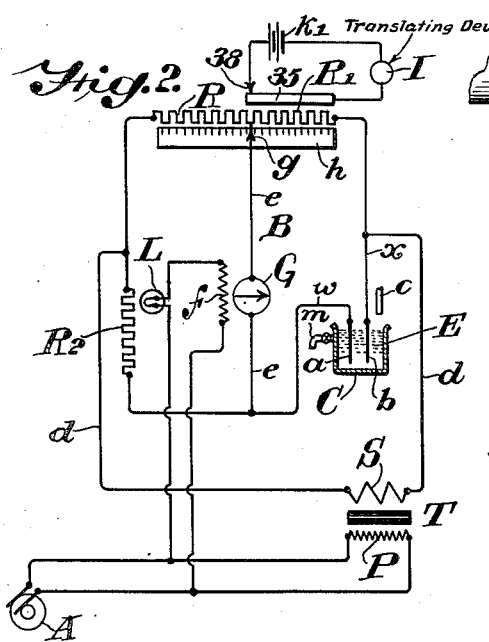
Fig. 2 is a diagrammatic view of one of the circuit arrangements which may be used in accordance with my invention.

Referring to Fig. 2, there is shown a Wheatstone or conductivity bridge B having in its four arms the resistances R, R$^1$, R$^2$, and the cell C, of any suitable character or form for correlating with suitable electrolytes the solution or electrolyte whose resistance, conductivity or concentration is to be measured. The boiler water, or other solution, may be continuously delivered in very small sample or quantity at suitable rate through the pipe $c$ into the cell C, from which it overflows through the pipe $m$. In the electrolyte or solution E are disposed the electrodes $a$ and $b$, both of platinum, which may be covered with platinum black, or of any other suitable material. In one of the conjugate conductors $d$ is a source of current, preferably alternating current; in the example illustrated this source is the secondary S of a step-down transformer T whose primary winding P is traversed by current from the alternating current generator A, as of ordinary commercial alternating current of suitably low frequency, for example, 60 cycles per second. In the other conjugate conductor $e$ is connected any suitable indicating or deflecting instrument, as for example, the movable coil of an alternating current galvanometer G whose field coil $f$ is traversed by alternating current from the generator A, any suitable resistance, as an incandescent lamp L, being connected in series with the winding $f$ when suitable or desirable. In general, the resistance L is preferably non-inductive and of very high magnitude so as to greatly predominate over the inductance of the winding $f$.

The conductor $e$ terminates in the brush or slider contact $g$ movable along the resistances R, R$^1$, the resistance R always being that portion to the left of the contact $g$ and the resistance R$^1$ always being that portion to the right thereof. The associated scale $h$ may be calibrated in any suitable units, as those of resistance, conductivity or concentration of the electrolyte E, whereby the desired quantity may be read directly from the scale $h$; or the magnitude may be calculated from the reading immediately beneath the brush $g$ when the scale does not read directly in the desired units. Relative movement between the resistances R, R$^1$ and the brush or contact $g$ may be effected manually or automatically, as hereinafter described. When the contact $g$ is operated manually, it is moved to such position that the deflection of the galvanometer G is zero, and the conductivity or concentration of the electrolyte E may then be read off from the scale $h$, which latter, in the case of automatic balancing hereinafter described, may move with the resistances R, R$^1$ The operator will then know, from the information afforded by the scale $h$, or otherwise, when the concentration of the salts or electrolyte, as in boiler water, attains a predetermined value of maximum, whereupon water may be blown out of the boiler and new water of lower salt concentration admitted.

Physically connected by any suitable means, not shown, with the contact $g$, which may be manually operated along the resistance R, R$^1$ over the scale $h$, is a contact 38, adapted to engage and be moved along the contact 35, the contacts 35 and 38 controlling a circuit containing the source of current $k^1$ and the translating device I, which may be an indicator, alarm, motor, or any other suitable device.

To compensate for variations in temperature of the electrolyte E, which would otherwise introduce error, I impress upon the bridge B, preferably upon the galvanometer G, a compensating electro-motive-force which varies with variations in temperature of the electrolyte in such way as electrically to compensate or correct for temperature variation.

This compensating electro-motive-force may be produced in any suitable manner.

As indicated in Fig. 3, such compensating electro-motive-force is provided by a conjugate conductor of a second Wheatstone bridge B$^1$, or equivalent. In the four arms of the bridge B$^1$ are the resistances R$^3$, R$^4$ R$^5$ and R$^6$, the latter preferably of nickel or any other solid or liquid material having preferably substantial or high temperature co-efficient. For example, the resistance R$^6$ may be of iron, aluminum, copper, electrolyte, etc. By employing for resistance R$^6$ suitable material, the magnitude of temperature correction may be varied to suit circumstances. The nickel resistance R$^6$ has high positive temperature co-efficient, while the resistances R$^3$, R$^4$ and R$^5$ have very small or substantially zero temperature co-efficients. And similarly, the resistances R, R$^1$ and R$^2$ of the bridge B preferably have small or substantially zero temperature coefficients. In circuit with one of the conjugate conductors $i$ of the bridge $B^1$ are connected the variable resistance or rheostat $R^7$ and the secondary $S^1$ of the step-down transformer $T^1$, whose primary $P^1$ is connected to the alternating current generator A, the voltages impressed by the transformers T and $T^1$ upon the bridges and B and $B^1$ being preferably low, and in any event, suitably low for the purposes intended. The second conjugate conductor $j$ has its one terminal connected to a point between the resistances $R^5$ and $R^6$, and its other terminal connected at $k$ to suitable point along the resistances $R^3$, $R^4$. The contact $k$ may be fixed and determined, or may be slidable, for suitable correction or adjustment purposes. In circuit with the conjugate conductor $j$ is connected the conjugate conductor $e$ or the movable coil of the galvanometer G of the bridge $B^1$, whereby the galvanometer G is common to the conjugate conductors $e$ and $j$ of bridges B and $B^1$.

The resistance $R^6$ is in any suitable way subjected to the temperature of the electrolyte E, or to a temperature having a predetermined or known relation to the temperature of the electrolyte E. In the example illustrated, the resistance $R^6$ is immersed directly in the electrolyte E, any suitable means, not shown, preferably being provided suitably to electrically insulate the resistance $R^6$ from the electrolyte E.

With the contact $k$ in fixed connection with the resistances $R^3$, $R^4$, or having been adjusted to predetermined or suitable position, change of temperature of the electrolyte E effects a change of temperature of the resistance $R^6$ whose resistance accordingly changes and unbalances the bridge $B^1$, if it had been in balance, or changes the degree of unbalance, with the result that there is a change of difference of potential between the terminals of the conjugate conductor $j$, and this potential difference, of the same frequency and preferably in phase with the electro-motive-force of the bridge B, is impressed upon the galvanometer G co-acting thereon with the potential difference between the terminals of the conjugate conductor $e$ of the bridge B. In consequence, the resultant electro-motive-force impressed upon the galvanometer G makes the balancing or readings of the bridge $B^1$ more or less perfectly correct for variation in temperature of the electrolyte E.

The magnitude of the compensating electro-motive-force may be predetermined or set by suitably adjusting the resistance $R^7$.

Variations in voltage of the generator A will introduce no error, since the electromotive-forces of the secondaries S and $S^1$ will similarly vary.

While in Figs. 2 and 3 I have shown Wheatstone bridges, it will be understood that my invention comprehends equivalents thereof, as for example, a potentiometer in lieu of either or both of the bridges B and $B^1$.

Figure 4:
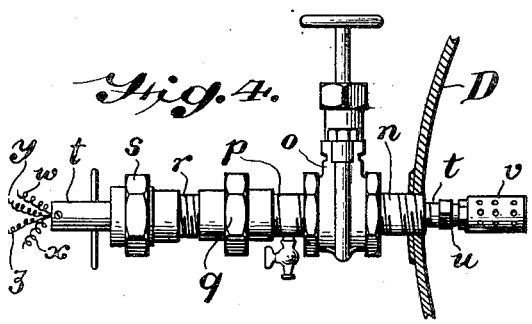
Fig. 4 is a view, partly in section and partly in elevation, of a conductivity cell structure utilizable in accordance with my invention.

As indicated in Fig. 4, the conductivity cell may comprise an arrangement whereby the electrodes, as $a$ and $b$, of Fig. 2, or electrodes $a$, $b$ and resistances $R^6$, of Fig. 3, may be inserted directly into the interior of the boiler indicated at D, by employment of any suitable structure. Such structure is indicated as comprising a pipe $n$ threaded through the shell of the boiler D and connecting with the gate valve $o$ connected by pipe $p$ with the union $q$ connecting the pipe $r$ with the stuffing box or gland structure $s$, a tube $t$ extending through the stuffing box or gland $s$ and through the pipes, union and gate valve to the interior of the boiler, the tube carrying at its end by suitable structure $u$ the electrodes $a$ and $b$, and also resistance $R^6$, when employed, these electrodes and resistance being housed within the enclosing screen or chamber $v$ permitting access of the boiler water or other solution to the electrodes. The conductors from the electrodes and resistance are led through the tube $t$ to the exterior, these conductors being indicated as $w$, $x$ for the electrodes $a$ and $b$ and as $y$ and $z$ for the resistance $R^6$, these same reference characters being employed in Figs. 2 and 3 to indicate the mode of connection of this device in the bridge circuits.

With the direct insertion of the conductivity cell into the interior of the boiler, the temperature compensation may be dispensed with, if desired, when the boiler pressure does not materially vary, for under such circumstances the temperature of the electrolyte will be substantially constant. However, when the cell is introduced into a boiler whose pressure varies materially, or into any other vessel in which the temperature of the electrolyte varies materially, the resistance $R^6$ may be employed as described.

Figure 5:
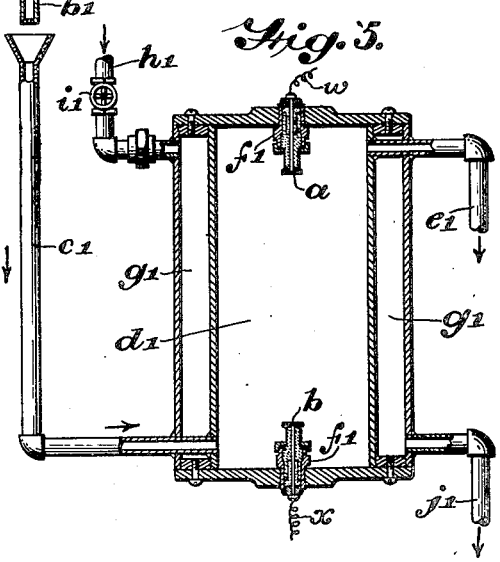
Fig. 5 is a vertical sectional view, partly in elevation, of a modified form of conductivity cell with means for maintaining constant temperature thereof.

In Fig. 5 is shown an arrangement of the conductivity cell embodying means for maintaining the temperature of the electrolyte substantially constant. From the boiler or other source D a small sample of the electrolyte or solution, controllable by the valve $a^1$, is delivered through the pipe $b^1$ to the pipe $c^a$ which delivers it into the conductivity cell or chamber $d^1$ and from which it passes out through the pipe $e^1$; through the opposite walls of the chamber $d^1$ extend plug structures $f^1$, $f^1$ having at their inner ends the electrodes $a$ and $b$ communicating through the plug structures with the exterior conductors $w$ and $x$ for connection in in the bridge B or equivalent. Surrounding the cell or chamber $d^1$ is the jacket space $g^1$ through which is circulated any suitable medium at any suitable and preferably substantially constant temperature. For example, steam at 212 degrees F. may be delivered by the pipe $h^1$ in quantity controlled by the valve $i^1$, into the jacket $g^1$, from which it passes out through the pipe $j^1$.

For automatically making a record of or corresponding with variations in salt concentration in boiler water, or, in general, electrolytic or conductive solutions, and for automatically effecting a control responsive to variation of conductivity or concentration, apparatus of the character about to be described such as disclosed in prior Patent No. 1,125,699, or equivalent, may be employed.

Referring to Fig. 6, M is an electric motor, or any other suitable source of power, which rotates the shaft 1, preferably at substantially constant speed, which in turn drives the worm 2 which drives the worm gear 3 secured upon the shaft 4. Pivoted near its upper end is a lever 5, back of which and pivoted upon the lever 5 on a horizontal axis is the arm 6, on each end of which is a shoe 7 of cork or other suitable material frictionally engaging the rim 8 of the clutch disk or wheel 9 secured upon the shaft 10. Secured upon the shaft 4 is a cam 11 which periodically engages the lever or member 5 and moves it outwardly away from the disk 9 in opposition to a spring, not shown, thereby lifting the shoes 7 free from the rim 8, the aforesaid spring returning the shoes 7 into engagement with the rim 8 after predetermined rotation with the cam 11. Upon the shaft 4 is secured a second cam 12 which, after the cam 11 has lifted the shoes 7 from rim 8, actuates the end of finger 13 on the lower end of the arm 14 secured at its upper end to the member 15 pivoted at 16. Upon the frame or member 15 is secured the member 17 whose upper edge 18 is inclined and increases in height from the center toward each side. Disposed immediately above the edge 18 is the needle or pointer 19 of any suitable measuring or indicating instrument, as, for example, a galvanometer of which 20 is the movable coil or element which swings or deflects the needle or pointer 19. This galvanometer may be the galvanometer G of the bridge arrangements of Figs. 2 and 3, or of potentiometer or equivalent arrangements. At opposite ends of the member 17 are the abutments 21 for limiting the deflection or swing of the needle 19. Above the needle 19 and beneath which it normally freely swings are the edges 22, preferably straight and horizontal, upon members 23, pivoted at 24, 24 and extending toward each other, leaving a gap of sufficient width between their inner ends to allow the free entry of the needle 19 when in balanced, zero or mid position, the needle 19 normally swinging between the edges 18 of member 17 and the lower edges 22 of the members 23, which have the downwardly extending arms 25, 25 drawn toward each other by the spring 26. Attached to the lower end of the arm 5 is the triangular plate 27 carrying the pins 28, 28 co-operating with the lower ends of members 25, 25. At opposite ends of the arm 6 are the ears or lugs 29, 29 adapted to be engaged by the cams 30, 30 similar in shape and similarly positioned and secured upon the shaft 4.

Secured upon the shaft 10 is a disk or wheel 31 of insulating material carrying upon its periphery a resistance constituting the resistances R and $R^1$ of Figs. 2 and 3, or equivalent potentiometer or other controlling circuit. This resistance conductor may be disposed in the form of a helix laid upon the wheel 31. Engaging the resistances R, $R^1$ is the stationary brush or contact $g$ of Figs. 2 and 3, or equivalent control circuit. The disk 31 may be secured to the shaft 10 in any suitable angular relation with respect thereto by the set screw 32 threaded through the hub 33. The scale $h$ of Figs. 2 and 3 may be inscribed upon or carried by the disk 31, and co-act with any suitable stationary pointer, as brush $g$.

Secured upon the shaft 10 is a second wheel or disk 34 carrying the arcuate contact 35. This disk is shown in Figs. 7 and 8 and as indicated, may be secured in any desired angular position upon the shaft 10 by the nut 36 threaded upon the end of the shaft 10, to which is secured the member 37, between which and the nut 36 the disk 34 may be clamped, the shaft 10 passing freely through the disk 34. Co-acting with the contact 35 is the brush 38, both shown in Figs. 2 and 3 in association with the bridges B. The contacts 35 and 38 control any suitable circuit containing any suitable source of current $k^1$ and any suitable translating device I.

Secured upon the shaft 10 is the grooved pulley or wheel 39 around which passes the cord 40, which passes over suitable pulleys 41 and is secured to the marker or recorder pin 42, movable transversely, on guides, not shown, with respect to the recorder paper F, upon which it draws a record mark or curve 43. The paper F is stored upon a roller or spool 44 and has the marginal perforations 45 engaging teeth or pins upon the periphery of the roller 46 secured upon the shaft 47 driven by the motor M through the worm 48, gear 49, shaft 50, worm 51 and gear 52 secured upon shaft 47.

The operation is as follows:

Assuming that the conductivity or concentration of the electrolyte E in the cell C or in the devices shown in Figs. 4 and 5, or in any other suitable arrangement, changes, there will be an unbalancing of the bridge B or equivalent, with the result that the galvanometer coil 20 will deflect its needle 19, for example, toward the right, as viewed in Fig. 6. Due to the periodic vertical movement of the member 15 by cam 12 driven by shaft 4, the needle 19 will be clamped between the inclined edge 18 and the lower edge 22 of the right hand member 23, causing the right hand arm 25 to be tilted on its pivot 24 in a clockwise direction, thereby pushing on the right hand pin 28 on plate 27 to tilt the movable or driving clutch member or arm 6 in a clockwise direction, while cam 11 is holding shoes 7, 7 from the rim 8 of wheel 9, the extent and direction of angular movement of the member 6 being dependent upon the degree and direction of deflection of the needle 19 and therefore upon the extent and direction of unbalancing of the bridge B, or equivalent, and therefore upon the extent and direction of conductivity or concentration of the electrolyte. The cam 11 soon allows, because of further rotation of the shaft 4, the shoes 7, 7 again to grip the rim 8 of disk 9, and soon thereafter the left hand cam 30 engages the left lug 29, which has been elevated, pushing it downwardly and restoring arm 6 to horizontal position indicated, and in so moving back to normal position the member 6 rotates the clutch disk 9 in counter-clockwise direction, rotating shaft 10 and disks 31 and 34 in like direction. By this action the bridge arms R, R¹ are moved in a counter-clockwise direction with respect to the brush g in such direction and to such extent as to rebalance or tend to rebalance the bridge. This action continues automatically, whereby the marker 42 is moved transversely of the paper F to produce thereon the mark or curve 43 representative by its position transversely of the paper of the degree of conductivity or concentration of the electrolyte. Simultaneously, the contact 35 is rotated with respect to the stationary brush 38, and after such disk 34 has been rotated through any predetermined angular extent, representative of arrival of the conductivity or concentration of the electrolyte at any predetermined value, the contact 35 and brush 38 will come into engagement with each other and thereby close the circuit containing the translating device I, causing its actuation or control.

The translating device may be an indicator or alarm, giving indication or notice that the concentration of the electrolyte has reached a predetermined value. When the electrolyte is boiler water, such indication or alarm serves to give notice that water should be drawn off from the boiler and water of less salt concentration introduced in its place.

Or the device I may be a motor set into operation to actuate any suitable device, as a rheostat, valve mechanism or the like.

What I claim is:

1. The combination with a balancing circuit including a source of alternating current and an alternating current galvanometer having a deflecting member, of electrodes spaced from each other in said circuit, means for bridging said electrodes by solution of changing conductivity, a source of power, a movable structure, a disengageable mechanical connection between said source of power and said movable structure controlled by said deflecting member, means actuated by said movable structure for rebalancing said circuit upon change in conductivity of the solution between said electrodes, and a marker actuated by said movable structure.

2. The combination with a balancing circuit including a source of alternating current and an alternating current galvanometer having a deflecting member, of electrodes spaced from each other in said circuit, means for bridging said electrodes by solution of changing conductivity, a source of power, a movable structure, a disengageable mechanical connection between said source of power and said movable structure controlled by said deflecting member, means actuated by said movable structure for rebalancing said circuit upon change in conductivity of the solution between said electrodes, a second circuit, an indicating device controlled thereby, and means actuated by said movable structure for controlling said circuit to effect an indication upon occurrence of predetermined change in the magnitude of the conductivity of said solution between said electrodes.

3. The combination with an evaporator and a solution of changing conductivity therein, of electrodes spaced from each other and bridged by said solution of changing conductivity, a balancing circuit including said spaced electrodes and the solution therebetween, a source of alternating current, an alternating current galvanometer having a deflecting member, a source of power, a movable structure, a disengageable mechanical connection between said source of power and said movable structure controlled by said deflecting member, means actuated by said movable structure for rebalancing said circuit upon change in conductivity of said solution between said electrodes, and a marker actuated by said movable structure.

4. The combination with an evaporator and a solution of changing conductivity therein, of electrodes spaced from each other and bridged by said solution of changing conductivity, a balancing circuit including said spaced electrodes and the solution therebetween, a source of alternating current, an alternating current galvanometer having a deflecting member, a source of power, a movable structure, a disengageable mechanical connection between said source of power and said movable structure controlled by said deflecting member, means actuated by said movable structure for rebalancing said circuit upon change in conductivity of said solution between said electrodes, a second circuit, an indicating device controlled thereby, and means actuated by said movable structure for controlling said circuit to effect an indication upon occurrence of predetermined change in the magnitude of the conductivity of said solution between said electrodes.

In testimony whereof I have hereunto affixed my signature this 18th day of October, 1920.

EARL A. KEELER.